United States Patent
Bharti et al.

(10) Patent No.: US 12,417,131 B2
(45) Date of Patent: Sep. 16, 2025

(54) COMPUTER-BASED SERVICE CHAIN NODE ADEQUACY FRAMEWORK

(71) Applicant: International Business Machines Corporation, Armonk, NY (US)

(72) Inventors: Harish Bharti, Pune (IN); Rajesh Kumar Saxena, Thane East (IN); Sandeep Sukhija, Rajasthan (IN); Deepak Bajaj, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 17/806,201

(22) Filed: Jun. 9, 2022

(65) Prior Publication Data

US 2023/0401105 A1    Dec. 14, 2023

(51) Int. Cl.
  *G06F 9/50* (2006.01)
  *H04L 41/12* (2022.01)
(52) U.S. Cl.
  CPC ............ *G06F 9/5083* (2013.01); *H04L 41/12* (2013.01)
(58) Field of Classification Search
  CPC .............................. G06F 9/5083; H04L 41/12
  See application file for complete search history.

(56) References Cited

U.S. PATENT DOCUMENTS

| | | | | |
|---|---|---|---|---|
| 2004/0042476 A1* | 3/2004 | Peacock | .................. | H04L 43/00 370/229 |
| 2018/0054237 A1* | 2/2018 | Tseng | ................ | H04W 36/0022 |
| 2020/0008067 A1* | 1/2020 | Filsfils | .................. | H04L 47/825 |
| 2021/0075730 A1* | 3/2021 | Palermo | .................. | H04L 47/62 |
| 2024/0323647 A1* | 9/2024 | Labriji | ..................... | H04W 4/40 |

FOREIGN PATENT DOCUMENTS

| | | |
|---|---|---|
| CN | 110149646 A | 8/2019 |
| CN | 110809261 A | 2/2020 |

OTHER PUBLICATIONS

Han, et al., "Multiservice-based Network Slicing Orchestration with Impatient Tenants", arXiv:1909.04585v1, Sep. 6, 2019, 28 pages, <https://www.researchgate.net/publication/335738130>.

Kasgari, et al., "Stochastic Optimization and Control Framework for 5G Network Slicing with Effective Isolation", arXiv:1801.10282v1, Jan. 31, 2018, 7 pages, <https://www.researchgate.net/publication/325354894>.

(Continued)

*Primary Examiner* — Wissam Rashid
(74) *Attorney, Agent, or Firm* — Joseph P. Curcuru

(57) ABSTRACT

In an approach to improve service chain node adequacy, embodiments utilize fifth-generation technology standard (5G) for broadband cellular networks architecture for creating relevant network slices for dedicated business processes, to ensure that each node within the network slice has stabilized operations. Embodiments employ an optimization technique, maximize a model of network adequacy to ensure there is a predetermined amount of adequacy to handle a request, and introduce the model for pre-processor without impacting existing functionality. Embodiments apply one or more constraints to one or more systems to balance the one or more queues; and implement a rapid packet delivery to a subsequent entity comprising decongested queues.

19 Claims, 4 Drawing Sheets

(56) References Cited

OTHER PUBLICATIONS

Shuminoski, et al., "5G Terminals with Multi-Streaming Features for Real-Time Mobile Broadband Applications", Radioengineering, vol. 26, No. 2, Jun. 2017, pp. 470-478, <https://www.researchgate.net/publication/317587147>.

Shuminoski, et al., "Lyapunov Optimization Framework for 5G Mobile Nodes With Multi-Homing", IEEE Communications Letters, vol. 20, No. 5, May 2016, pp. 1026-1029, <https://ieeexplore.ieee.org/document/7430261>.

Tang, et al., "Queue-Aware Reliable Embedding Algorithm for 5G Network Slicing", Computer Networks, Accepted manuscript, Accepted date: Sep. 12, 2018, 17 pages,<https://doi.org/10.1016/j.comnet.2018.09.014>.

\* cited by examiner

COMPUTER-BASED SERVICE CHAIN NODE ADEQUACY FRAMEWORK

BACKGROUND OF THE INVENTION

The present invention relates generally to service chain nodes, and more particularly to the field of chaining virtual network functions to provide a computer based service.

The fifth-generation technology standard (5G) for broadband cellular networks core (5GC) establishes reliable and secure connectivity to the network for end users and provides access to its services and implements the new third (3rd) generation partnership project (3GPP) network architecture that will maximize the power of 5G standalone and enable faster connectivity speeds, ultra-low latency, and higher bit rates and network reliability. These capabilities, combined with network automation, network slicing and edge computing, are instrumental to address multiple verticals and enable an ecosystem for innovation with use cases such as: enhanced mobile broadband (eMBB), Ultra Reliable Low Latency Communication (URLLC), massive Machine Type Communication (mMTC) and Time-Critical Communication (TCC). The concept of network function virtualization in 5GC is utilized for the creation of virtual networks functions which are chained to provide different services for users. 5G network slicing concept is introduced and coined by Next Generation Mobile Network (NGMN). NGMN defines network slice as an end-to-end logical network/cloud running on a common underlying infrastructure which are well isolated controlled and managed independently. It can be created on demand. Network architecture creates relevant network slices for dedicated business process. A network slice takes input from different queues or from some of the queues and marshalled the data. Data from different sources (i.e., requests from different devices) reaches to different service processor via an orchestrator each are stacked in the queue depending on the type of request message, wherein each queue is expected to hold the message data of specific type. Network slice may consist of multiple different or all queues of these type.

SUMMARY

Embodiments of the present invention disclose a computer-implemented method, a computer program product, and a system, the computer-implemented method comprising: employing an optimization technique; maximizing a model of network adequacy to ensure there is a predetermined amount of adequacy to handle a request, wherein one or more models constrains one or more queues from becoming unstable; introducing the model for pre-processor without impacting existing functionality, wherein the model ensures that a calculated decision are taken at a service processor to make sure that a stabilization of one or more network slices; applying one or more constraints to one or more systems to balance the one or more queues; and implementing a rapid packet delivery to a subsequent entity comprising decongested queues.

DETAILED DESCRIPTION

Embodiments of the present invention recognize that fifth-generation technology standard (5G) for broadband cellular networks is going to power millions of homes, urban and workspace devices. Embodiments of the present invention recognize that 5G core (5GC) consists of the network slices which consist of many queues that holds messages packet based on types. Embodiments of the present invention recognize that proper functioning of the queues is very critical for the functioning of the network slice which may consists of some or all these queues as per the business process defined. Embodiments of the present invention recognize that during the marshalling of data from queues Next Generation Mobile Network (NGMN), via a network slice, waits for the missing frame (e.g., a frame that has not been transferred to another queue due to piling of message) instead of complete rejecting the message; however, during wait time if the message is not deciphered than NGMN rejects all the messages in the queue and issues a secondary request for the messages. Embodiments of the present invention recognize that this instability in the queue results in an instable network slice. Embodiments of the present invention recognize that it is important to ensure that each node within the slice has stabilized operations. Embodiments of the present invention improve the art and solve at least the issues stated above by providing a framework to identify the queues prior to instability (i.e., service chain node adequacy).

Further, to improve the art by ensuring the proper functioning of the queues which act as input for network slices, embodiments of the present invention provide a framework that optimizes the mechanism of queueing. Embodiments of the present invention may identify the queues that will be unstable down the line, and empower service processor layer to implement a mitigating action and ingest a packet message to the queue accordingly which act as an input for network slice. The analysis and design methodology of embodiments of the present invention may be based on the adaptive queuing Lyapunov optimization techniques which are powerful for optimizing the time average of resource requirements such as but not limited to memory, and the central processing unit (CPU). Additionally, embodiments of the present invention improve the art and solve at least the issues stated above by (i) maximizing a node throughput subject to average resource, (ii) minimizing average queue backlogs, subject to minimal queue network delay, and (iii) simultaneously achieving network stability.

Implementation of embodiments of the invention may take a variety of forms, and exemplary implementation details are discussed subsequently with reference to the Figures (i.e., FIG. 1-FIG. 4).

Figure 1:
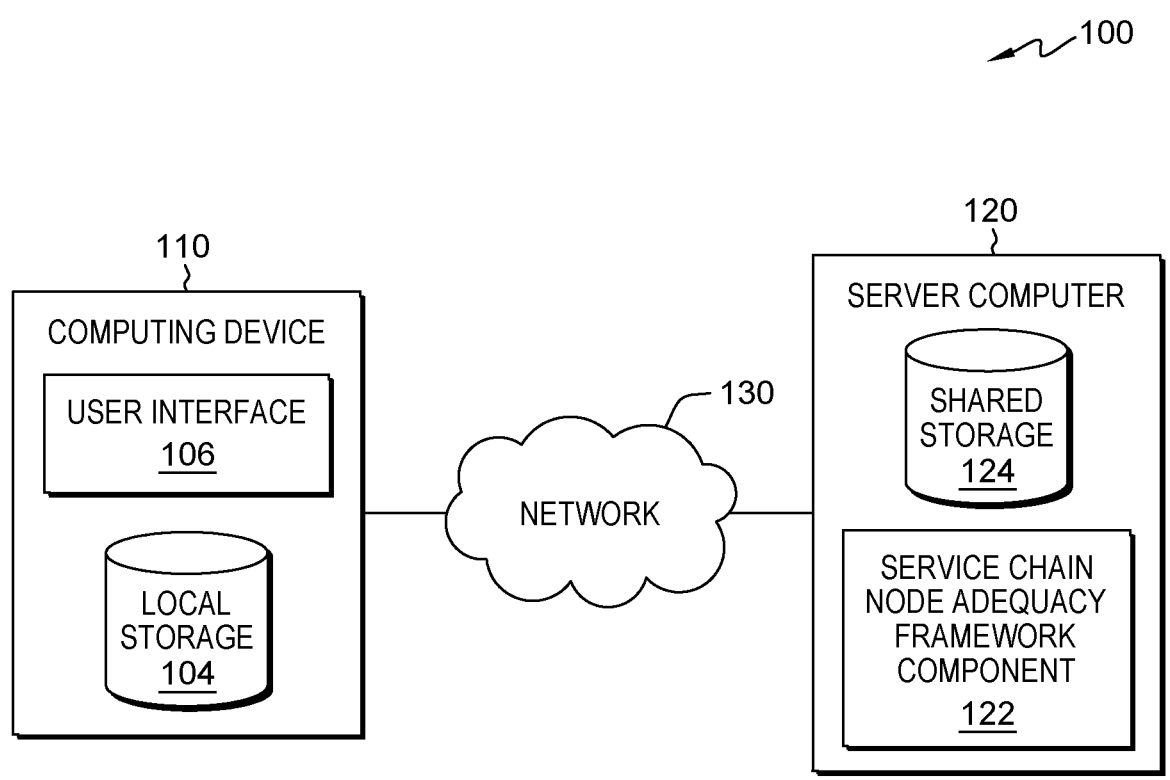
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 5.

User interface (interface) 106 provides an interface to service chain node adequacy framework component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 5. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1, in addition to shared storage 124, server computer comprises a primary and a secondary database, described below in FIG. 5.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In various embodiments, not depicted in FIG. 1, component 122 comprise various components (see FIG. 2).

In various embodiments, component 122 provides adequacy within service nodes for a service chain to execute, based on one or more optimization techniques, where the nodes are analyzed, and the queues are balanced. Component 122 may balance one or more queues if the following constraints are met: (i) at a given slot of time the queues are available for work (e.g., the queues comprise a predetermined amount of available space), (ii) the queues outputs (processing efficiency) are stable, (iii) resource requirement for the remaining job of the service chain is available at the node, and (iv) a previously executed subroutine is being executed so the system is not being jeopardizing with an unknown resource requests. If the four constraints, above, are met then component 122 applies the adequacy method to the queue, wherein the limits are applied to find superior values and identify that the service node rate is stable (i.e., able to process the demand). Component 122 may utilize 5G architecture to create relevant network slices for dedicated business processes, to ensure that each node within the network slice has stabilized operations. Each network slice is an isolated end to end network tailored to fulfil specific requirements requested by a particular Business Process. While the concept of network slice already exists, component 122 improves the art by identifying and creating one or more network slices that fit an identified situation/scenario. For example, a first network slice is created for a live streaming event and a second network slice is created for an asynchronous messaging service, wherein the sizes of both network slices are optimally sized to provide a predetermined quality of service.

Component 122 may utilize a maximization model to prevent a queue from becoming unstable for average time flow and rate stability of the queue. In various embodiments, component 122 utilizes a pre-processor without impacting any existing functionality (i.e. enabled to perform any known actions under supporting backhauling protocol, like pushing packets to a queue, while comprising a maximal output serving rate $\mu_j(t)$ of less than the rated latency). Component 122 may ensure that a calculated decision is executed at one or more service processors to maintain the stabilization of one or more network slices, which marshals data from many queues (i.e. executing a decision and holding the packets in the buffer leading to the quick stabilization of a network slice). Component 122 may prevent excessive buffering based on the constraints and may decongest one or more queues to enable throttle and issue a rapid packet delivery to one or more subsequent entities. Component 122 may introduce a scheduling framework for pre-processing, wherein the pre-processing does not impact any existing functionality of the service processor (e.g., the existing functionality is enabled to perform any known action under the supporting backhauling protocol like pushing packets to other predetermined queues and the maximal output serving rate $\mu_j(t)$ will be less than rated latency). Meaning there would be no change to existing processing outcome. In various embodiments, the scheduling framework ensures that the calculated decision are taken at one or more service processors to ensure the stabilization of network slices, which marshals data from many queues and holds one or more packets in the buffer. Component 122 may execute a quick stabilization of a network slice. In various embodiments, as a network slice marshals the data from one or more queues that ingest data, component 122 brings a stabilization to the one or more queues by applying one or more constraints to one or more systems experiencing excessive buffering, and implementing a rapid packet delivery to a subsequent entity comprising decongested queues.

In various embodiments, component 122 employs an optimization technique, and maximizes a model of network adequacy to ensure there is a predetermined amount of adequacy to handle a request, wherein one or more models constrains one or more queues from becoming unstable. Component 122 may introduce the model for pre-processor without impacting existing functionality, wherein the model ensures that a calculated decision are taken at a service processor to make sure that a stabilization of one or more network slices, apply one or more constraints to one or more systems to balance the one or more queues; and implement a rapid packet delivery to a subsequent entity comprising decongested queues. In various embodiments, responsive to determining one or more queue constraints are met, component 122 applies the model of network adequacy to the one or more queues, wherein one or more predetermined limits are applied to find superior values and identify that a service node rate is stable, and wherein one or more queue constraints comprise: identifying at a given slot of time that the one or more queues are available for work, identifying one or more outputs of the one or more queues stable, identifying one or more resource requirements for remaining jobs of a service chain are available at a node, and executing a previously executed subroutine to ensure the system is not being jeopardized with unknown resource requests. Identifying may be construed to mean calculate. In various embodiments, responsive to determining a queue has reached a predetermined depth threshold, component 122 places a packet in a data buffer to stabilize the one or more network slices. Component 122 may utilize 5G architecture to create relevant network slices for dedicated business processes, to ensure that each node within the one or more network slices comprises stabilized operations.

Figure 2:
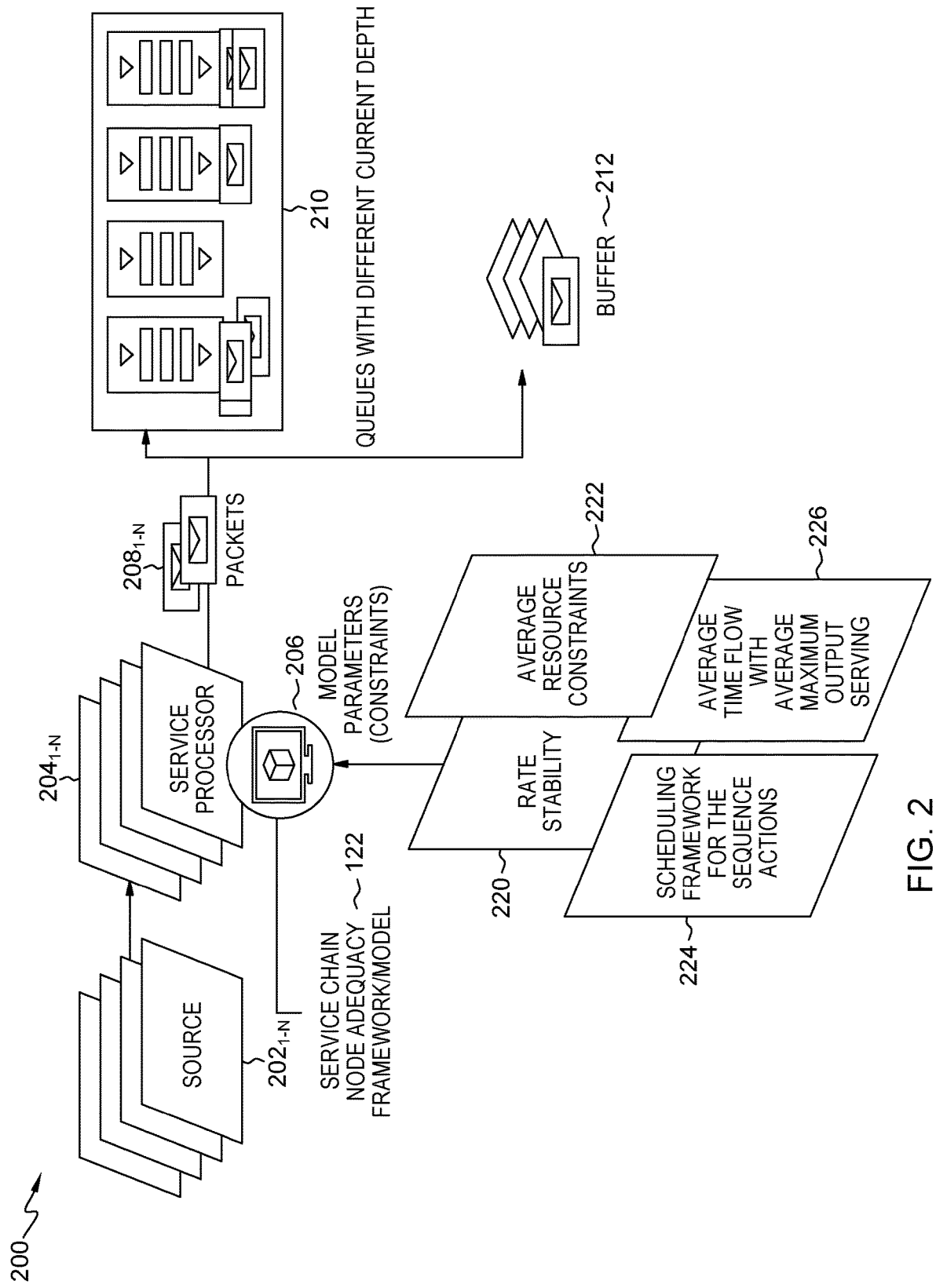
FIG. 2 is a functional block diagram illustrating a distributed data processing environment of a service chain node adequacy framework component, in accordance with an embodiment of the present invention.

FIG. 2 is a functional block diagram illustrating a distributed data processing environment, generally designated 200, detailing component 122, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Consider 'N' application sources (i.e., source $202_{1-N}$) with stationary independent processes with arrival rate xi(t) at time t, which represents the continual function whereas for the discrete in slotted time [0,1] is $x_\theta(t)$. Here virtual queues of finite length are defined. The weight factors $\omega_i$ is applied to balance the queue. In the event of multi-streaming (i.e., division of one stream and/or distribution of one stream over different queues) component 122 may achieve maximal serving rate µj(t) for each interface. Source $202_{1-N}$, herein source(s) 202 may represent one or more sources where "N" represents a positive integer, and accordingly the number of scenarios implemented in a given embodiment of the present invention is not limited to those depicted in FIG. 2.

More specifically, 'N' application sources (i.e., source(s) 202) may be a stationary independent processes with arrival rates xi at slot 't' where $x_\vartheta(t)$ is for a particular function in the slotted time [0,1] and $Z_m(t)$ are the virtual queues defined with a finite length for rebalanced processes. Service processor $204_{1-N}$, herein service processor(s) 204 may execute multi-streaming process of division of one stream to cover various queues, where "N" represents a positive integer, and accordingly the number of scenarios implemented in a given embodiment of the present invention is not limited to those depicted in FIG. 2. In various embodiments, after each queue, component 122 attempts to achieve maximal output serving rate $\mu_j(t)$ on each interface j=1, 2, ... M, so the sum of all output serving rates, over time will also be the maximal value. Further, $\omega_i$ are the weight factors that are applied to balance the queue in the interval [0,1] such that $E_i\omega_i=1$, queue vector that evolves over the slotted time t∈{1, 2, ... } as $Q_m=Q_1(t)+Q_2(t) \ldots Q_m(t)$, and $\theta_m(t)$ is the average resource time required in the slotted time [0,1]. In the depicted embodiment, component 122 receives model parameters (constraints) 206 to output packets $208_{1-N}$, wherein constraints 206 comprise rate stability 220 average resource constraints 222, scheduling framework for the sequence actions (scheduling framework) 224, and average time flow with average maximum output serving (average time flow) 226, and wherein component 122 applies a maximization framework based on constraints 206. Packets $208_{1-N}$, herein service packets 208, where "N" represents a positive integer, and accordingly the number of scenarios implemented in a given embodiment of the present invention is not limited to those depicted in FIG. 2. In some embodiments, constraints comprise predetermined model parameters, rate stability 220, average resource constraints 222, scheduling framework for the sequence actions (scheduling framework) 224, and/or average time flow 226.

In the depicted embodiment, component executes pre-processing without impacting any existing functionality and pushes packets 208 to queues with different current depth (queues) 210 and/or buffer 212, wherein scheduling framework 224 ensures that the calculated decisions, described below, are taken at service processors 204 to make sure that the stabilization of network slices marshals data from one or more queues (e.g., executing a decision and holding packets 208 in buffer 212). Queues 210 may be one or more queues with different current depths. In various embodiments, buffer 212 is implemented when the queues 210 reaches a predetermined threshold. Buffer 212 may be a data buffer for packets 208 (e.g., messages) when the depth of queues 210 reaches a predetermined threshold.

In the depicted embodiment for each node (e.g., 5G node) component 122 applies a maximization framework to optimize a service chain node adequacy framework by implementing an optimization technique, wherein, in this particular embodiment, the optimization technique is Lyapunov adequacy for π(t) subject to: average time flow over the m-th $\overline{[x_t(t)]}_m$ queue considered with average maximum output serving rate (i.e., average time flow 226), depicted in Equation 1 below. In the depicted embodiment, the weight is applied to the all remaining input's m such that it is always less than the total output that can be generated as long as the weight ensures that latency is maintained.

$$\Sigma_{i=1}^N \omega_i \overline{[x_i(t)]}_m \leq \mu_m^{max} \forall m \in \{1,2,\ldots,M\} \quad \text{Equation 1:}$$

In the depicted embodiment, component 122 utilizes and calculates rate stability 220 based on the knowledge that the number of jobs in a queue grows asymptotically 'slower than t' when "t" goes to infinity, at least in some trajectories. Therefore, in various embodiments, component 122 comprises a constraint that all queues are rate stable. See Equation 2.

$$\lim_{t\to\infty} \frac{E\{|Q_m(t)|\}}{t} = 0 \ \forall \ m \in \{1, 2, \ldots, M\} \quad \text{Equation 2}$$

In the depicted embodiment, for a desired time, average resource constraints 222 are met as depicted by the execution of Equation 3, wherein for a given rate i.e. Q m (t) component 122 may be able to solve for all elements.

$$\lim_{t\to\infty}\left(\max_{m\geq 0}\overline{\theta_m(t)}\right) = 0 \ \forall \ m \in \{1, 2, \ldots, M\} \quad \text{Equation 3}$$

In various embodiments, scheduling framework 224 works for the sequence actions (as a part of the known universe of the actions that have been acted before). In the depicted embodiment, for all slots for t>0, time is averaged over 't' for $\forall m \in \{1, 2, \ldots, M\}$, wherein the discrete actions are averaged out using Equation 4.

$$\overline{x_m(t)} \triangleq \lim_{n\to\infty} \frac{1}{t} \int_{\vartheta=0}^{t-1} E\{|x_\vartheta(t)|\} \quad \text{Equation 4}$$

In various embodiments, for solving the general optimization problem above, component 122 utilizes the Lyapunov technique. Component 122 may enforce a first, second, and third constraint of the optimization problems, via Equation 5, represented by Equations 1-4 (i.e., rate stability 220, average resource constraints 222, and average time flow 226) with the actual queues, wherein the arrivals are for independently and identical distributed (i.i.d.) sources.

$$\pi(t)::(Q_m(t+1)=\max[Q_m(t)+x_m(t)-\mu_m(t),0]) \quad \text{Equation 5:}$$

In various embodiments, the virtual queues are introduced to ensure the desired general time average equality and inequality constraints from Equation 3 are satisfied. In Equation 6 the variables $\xi_m(t)$ are auxiliary variables for m∈{1, 2, 3, ..., M}, defined as:

$$\pi(t)::(Z_m(t+1)=\max[Z_m(t)+\xi_m(t),0]) \quad \text{Equation 6:}$$

In Equation 6, we find that a sum in which subsequent terms cancel each other, leaving only initial and final terms—thus known as telescopic sum is represented in Equation 7, wherein the superior limit is defined for Zm(t).

$$\pi(t)::(Z_m(t)-Z_m(0)\geq\Sigma_{\vartheta=0}^{t-1}\xi_m(\vartheta)) \quad \text{Equation 7:}$$

In various embodiments, component 122 follows that if $Z_m(t)$ is rate stable for all 'm' then the fourth constraint (i.e., scheduling framework 224) is satisfied with a probability of 1 based on the superior limit represented by Equation 8.

$$\pi(t) :: \left( \lim_{t \to 0} \overline{sup} \left( \frac{z_m(t)}{t} \right) \Vdash 1 \right)_{t \to \infty} \to$$

$$\left( \overline{x_m(t)} \triangleq \lim_{n \to \infty} \frac{1}{t} \int_{\vartheta=0}^{\tau-1} E\{|x_\vartheta(t)|\} \right) \Vdash 1 \quad \text{Equation 8}$$

In various embodiments, in Equation 8, the superior limit is applied to $Z_m(t)$ (i.e. the virtual queues defined). As per the equation, a first portion of the equation's superior limit to $Z_m(t)$ tends to value "1" when time trends to infinity. This yields the input rates for all variables under all given constraints which also will be valued at 1. This means that the portion of Equation 8 below, labeled Equation 9, will always be equal to the value of one, therefore the adequacy has been obtained for the variation.

$$\overline{x_m(t)} \triangleq \lim_{n \to \infty} \frac{1}{t} \int_{\vartheta=0}^{\tau-1} E\{|x_\vartheta(t)|\} = 1 \quad \text{Equation 9}$$

Based on at least the information provided above in FIGS. 1-2, component 122 improves the art by improving the stability and efficiency of nodes in network slices at least by optimizing queues in one or more nodes.

Figure 3:
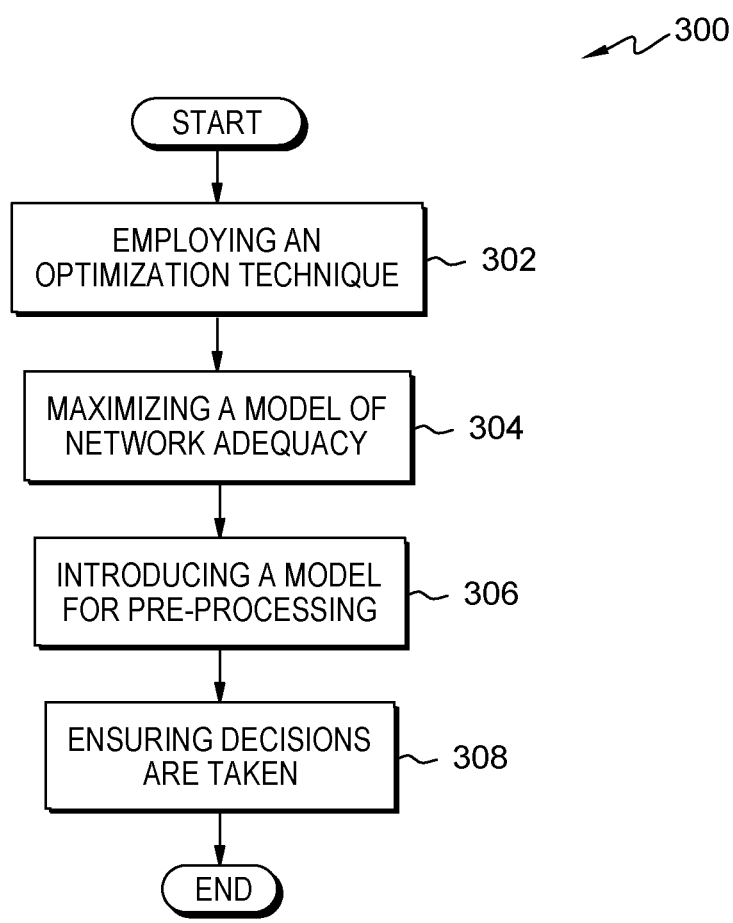
FIG. 3 illustrates operational steps of the service chain node adequacy framework component, on a server computer within the distributed data processing environment of FIGS. 1-2 in accordance with an embodiment of the present invention.

FIG. 3 illustrates operational steps of component 122, generally designated 200, in communication with server computer 120, within distributed data processing environment 300, for a computer-based implementation of a service chain node adequacy framework, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 employs an optimization technique. In various embodiments, component 122 employs one or more optimization techniques. In various embodiments, component 122 employs adaptive queuing Lyapunov optimization techniques that optimize time average.

In step 304, component 122 maximizes a model of network adequacy. In various embodiments, component 122 may maximized one or more models of network adequacy. In various embodiments, component 122 may maximize a model of network adequacy to ensure there is a predetermined amount of adequacy to handle the request, wherein one or more model constraints, see Equations above, prevent queues from becoming unstable. The one or more constraints that are employed may be (i) the average time flow, (ii) the rate stability of the queue, (iii) scheduling framework for the sequence of actions, and/or (iv) the average resource constraints are met.

In step 306, component 122 introduces a model for preprocessing. In various embodiments, component 122 may introduce one or more models for preprocessing. In various embodiments, component 122 introduces a scheduling framework model for pre-processing, wherein the pre-processing does not impact any existing functionality (e.g., the existing functionality is enabled to perform any known action under the supporting backhauling protocol like pushing packets other queues and yet maximal output serving rate $\mu_j(t)$ will be less than the rated latency).

In step 308, component 122 ensures decisions are taken at the service processors. In various embodiments, component 122 ensures that the calculated decisions by scheduling framework model for pre-processing are taken at service processors to maintain stabilization of one or more network slices, which marshals data from many queues (i.e., firing decision, holding the packets in the buffer).

Figure 4:
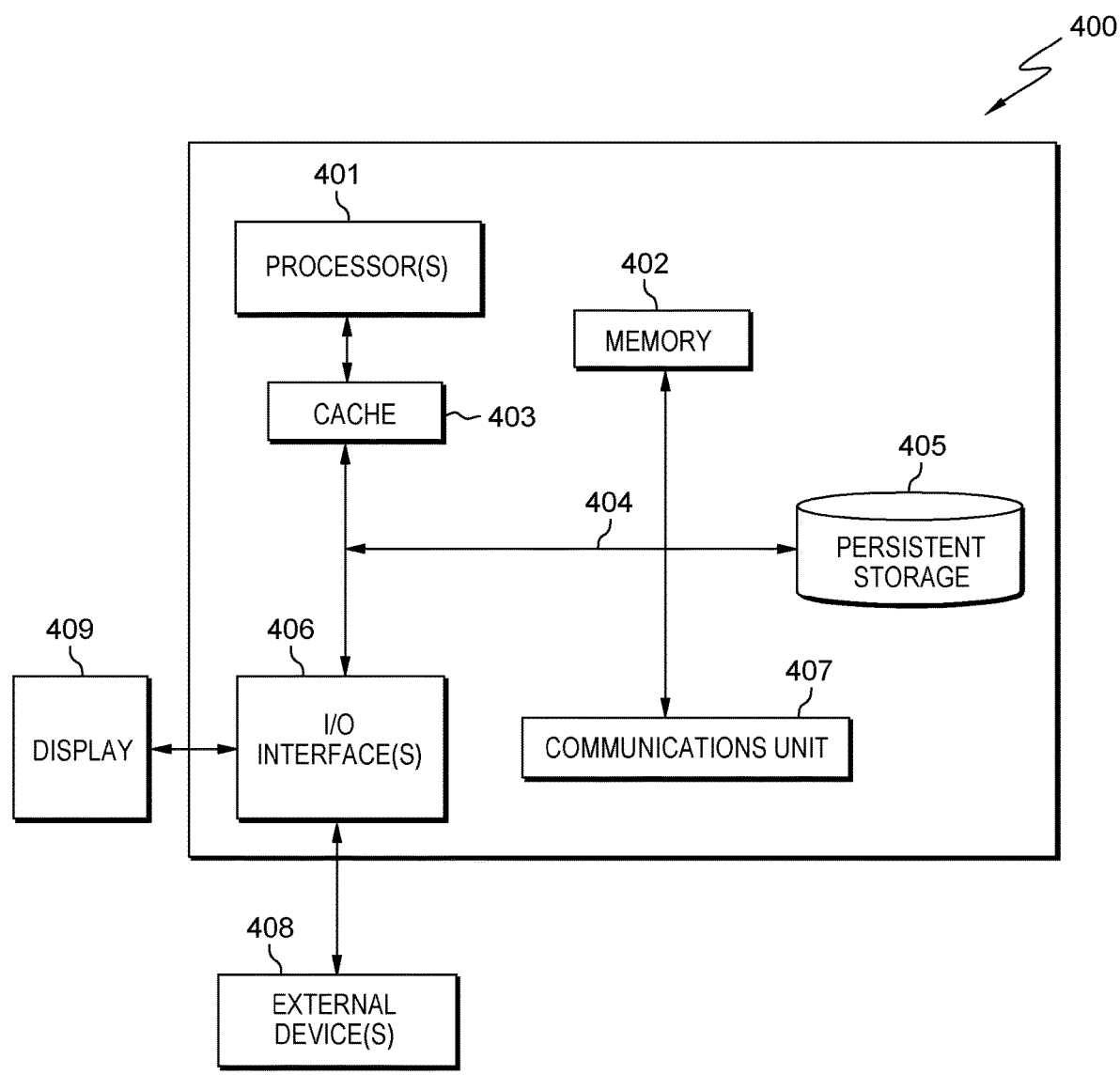
FIG. 4 depicts a block diagram of components of the server computer executing the service chain node adequacy framework component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computer 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for employing an optimization technique, the computer-implemented method comprising:
    utilizing a model of network adequacy to ensure there is a predetermined amount of resources to handle a request, wherein one or more models constrains one or more queues to stay within the predetermined amount of resources;
    introducing a scheduling framework for a pre-processor model without impacting existing functionality, wherein the model ensures that a calculated decision is taken at a service processor to make sure one or more network slices are within a predetermined value;
    applying one or more constraints to one or more systems to balance the one or more queues;
    responsive to determining the one or more constraints are met, applying the model of network adequacy to the one or more queues, wherein one or more predetermined limits are applied to find a value that is larger than a predetermined value and identify that a service node is within the predetermined amount of resources; and
    implementing the packet delivery to the subsequent entity comprising decongested queues.

2. The computer implemented method of claim 1, wherein the optimization technique is an adaptive queuing Lyapunov optimization technique for optimizing time average.

3. The computer implemented method of claim 1, wherein one or more model constraints comprise: average time flow, rate stability of one or more queues, average resource constraints.

4. The computer implemented method of claim 1, wherein the one or more queue constraints comprise:
    identifying, at a given slot of time, that the one or more queues are available for work;
    identifying one or more outputs of the one or more queues are within a predetermined amount of resources;
    identifying one or more resource requirements for remaining jobs of a service chain are available at a node; and
    executing a previously executed subroutine to ensure the system is not being above a predetermined amount of resources with unknown resource requests.

5. The computer implemented method of claim 1, further comprising:
    responsive to determining a queue has reached a predetermined depth threshold, placing a packet in a data buffer to stabilize the one or more network slices.

6. The computer implemented method of claim 1, further comprising:
    utilizing fifth generation (5G) architecture to create network slices for dedicated business processes, to ensure that each node within the one or more network slices comprises operations within a predetermined amount of resources.

7. A computer system for employing an optimization technique, the computer system comprising:
    one or more computer processors;
    one or more computer readable storage devices;
    program instructions stored on the one or more computer readable storage devices for execution by at least one of the one or more computer processors, the stored program instructions comprising:
        program instructions to employ an optimization technique;
        program instructions to utilize a model of network adequacy to ensure there is a predetermined amount of resources to handle a request, wherein one or more models constrains one or more queues to stay within the predetermined amount of resources;
        program instructions to introduce a scheduling framework for a pre-processor model without impacting existing functionality, wherein the model ensures that a calculated decision is taken at a service processor to make sure one or more network slices are within a predetermined value;
        program instructions to apply one or more constraints to one or more systems to balance the one or more queues;
        responsive to determining one or more queue constraints are met, program instructions to apply the model of network adequacy to the one or more queues, wherein one or more predetermined limits are applied to find a value that is larger than a predetermined value and identify that a service node is within the predetermined amount of resources; and
        program instructions to implement the packet delivery to the subsequent entity comprising decongested queues.

8. The computer system of claim 7, wherein the optimization technique is an adaptive queuing Lyapunov optimization technique for optimizing time average.

9. The computer system of claim 7, wherein one or more model constraints comprise: average time flow, rate stability of one or more queues, average resource constraints.

10. The computer system of claim 7, wherein the one or more queue constraints comprise:
    program instructions to identify, at a given slot of time, that the one or more queues are available for work;
    program instructions to identify one or more outputs of the one or more queues are within a predetermined amount of resources;

program instructions to identify one or more resource requirements for remaining jobs of a service chain are available at a node; and program instructions to execute a previously executed subroutine to ensure the system is not being above a predetermined amount of resources with unknown resource requests.

11. The computer system of claim 7, further comprising:
responsive to determining a queue has reached a predetermined depth threshold, program instructions to place a packet in a data buffer to stabilize the one or more network slices.

12. The computer system of claim 7, further comprising:
program instructions to utilize fifth generation (5G) architecture to create network slices for dedicated business processes, to ensure that each node within the one or more network slices comprises operations within a predetermined amount of resources.

13. A computer program product for employing an optimization technique, the computer program product comprising:
one or more computer readable storage devices and program instructions stored on the one or more computer readable storage devices, the stored program instructions comprising:
program instructions to employ an optimization technique;
program instructions to utilize a model of network adequacy to ensure there is a predetermined amount of resources to handle a request, wherein one or more models constrains one or more queues to stay within the predetermined amount of resources;
program instructions to introduce a scheduling framework for a pre-processor model without impacting existing functionality, wherein the model ensures that a calculated decision is taken at a service processor to make sure one or more network slices are within a predetermined value;
program instructions to apply one or more constraints to one or more systems to balance the one or more queues;
responsive to determining one or more queue constraints are met, program instructions to apply the model of network adequacy to the one or more queues, wherein one or more predetermined limits are applied to find a value that is larger than a predetermined value and identify that a service node is within the predetermined amount of resources;

program instructions to prevent a buffering that exceeds a predetermined threshold based on the one or more constraints and decongesting the one or more queues to enable throttle and issue a packet delivery to a subsequent entity; and
program instructions to implement the packet delivery to the subsequent entity comprising decongested queues.

14. The computer program product of claim 13, wherein the optimization technique is an adaptive queuing Lyapunov optimization technique for optimizing time average.

15. The computer program product of claim 13, wherein one or more model constraints comprise: average time flow, rate stability of one or more queues, average resource constraints.

16. The computer program product of claim 13,
wherein the one or more queue constraints comprise:
program instructions to identify at a given slot of time that the one or more queues are available for work;
program instructions to identify one or more outputs of the one or more queues are within a predetermined amount of resources;
program instructions to identify one or more resource requirements for remaining jobs of a service chain are available at a node; and
program instructions to execute a previously executed subroutine to ensure the system is not being above a predetermined amount of resources with unknown resource requests.

17. The computer program product of claim 13, further comprising:
responsive to determining a queue has reached a predetermined depth threshold, program instructions to place a packet in a data buffer to stabilize the one or more network slices.

18. The computer program product of claim 13, further comprising:
program instructions to utilize fifth generation (5G) architecture to create network slices for dedicated business processes, to ensure that each node within the one or more network slices comprises operations within a predetermined amount of resources.

19. The computer implemented method of claim 1, further comprising:
preventing a buffering that exceeds a predetermined threshold based on the one or more constraints and decongesting the one or more queues to enable throttle and issue a packet delivery to a subsequent entity.

* * * * *